(12) United States Patent
Tite et al.

(10) Patent No.: US 6,651,564 B1
(45) Date of Patent: Nov. 25, 2003

(54) HIGH ENERGY EXPLOSIVE FOR SEISMIC METHODS

(75) Inventors: Glen-Allan Tite, Stafford, TX (US); James E. Brooks, Manvel, TX (US); Wallace E. Voreck, Sparta, NJ (US)

(73) Assignee: Schlumberger Technology Corporation, Rosharon, TX (US)

( * ) Notice: Subject to any disclaimer, the term of this patent is extended or adjusted under 35 U.S.C. 154(b) by 367 days.

(21) Appl. No.: 09/617,879

(22) Filed: Jul. 17, 2000

(51) Int. Cl.⁷ .............................. F42D 3/06
(52) U.S. Cl. .......................... 102/312; 149/77
(58) Field of Search ................ 102/312, 313; 149/77

(56) References Cited

U.S. PATENT DOCUMENTS

| | | | | |
|---|---|---|---|---|
| 3,297,502 A | | 1/1967 | Chrisp ............................ 149/6 |
| 3,431,848 A | | 3/1969 | Foster ........................... 102/24 |
| 3,456,589 A | | 7/1969 | Thomison et al. ............. 102/23 |
| 3,496,040 A | | 2/1970 | Partridge ..................... 149/43 |
| 3,765,967 A | | 10/1973 | Funk et al. .................... 149/21 |
| 3,802,534 A | | 4/1974 | Barbier .......................... 181/5 |
| 3,946,357 A | | 3/1976 | Weinstein et al. ..... 340/15.5 TS |
| 3,948,177 A | | 4/1976 | Fitch ............................ 102/24 |
| 4,110,134 A | * | 8/1978 | Wade ............................ 149/2 |
| 4,388,254 A | | 6/1983 | Maes et al. .................. 264/3 C |
| 4,493,063 A | | 1/1985 | Tims et al. .................... 367/77 |
| 4,525,225 A | * | 6/1985 | Cechanski .................. 149/19.5 |
| 4,764,229 A | * | 8/1988 | Miekka et al. ................. 149/21 |
| 5,000,803 A | | 3/1991 | Hadermann ............... 149/19.92 |
| 5,007,973 A | | 4/1991 | Trapp et al. ............. 149/109.6 |
| 5,226,986 A | * | 7/1993 | Hansen et al. ........... 149/109.6 |
| 5,527,491 A | | 6/1996 | Riga ........................... 252/356 |
| 5,789,697 A | * | 8/1998 | Engelke et al. .......... 102/202.5 |
| 5,920,030 A | | 7/1999 | Day ............................ 102/313 |
| 5,996,501 A | | 12/1999 | Spencer et al. ............. 102/286 |

FOREIGN PATENT DOCUMENTS

GB    1151883    5/1969

* cited by examiner

*Primary Examiner*—Peter A. Nelson
(74) *Attorney, Agent, or Firm*—David S. Figatner; Williams, Morgan & Amorson

(57) ABSTRACT

An improved seismic method comprises the steps of generating seismic waves by exploding an explosive composition in a subterranean formation, wherein the explosive composition comprises a first explosive material and an oxidizable metal material, and detecting the seismic waves and/or reflections thereof with seismic detectors. Also disclosed are geophysical survey systems that comprises a seismic energy source comprising a first explosive material and an oxidizable metal material, the seismic energy source being located in a subterranean formation, and a plurality of seismic detectors that are adapted to detect seismic waves generated when the seismic energy source explodes and reflections of these waves. A method of preparing an explosive composition is also disclosed.

33 Claims, 1 Drawing Sheet

HIGH ENERGY EXPLOSIVE FOR SEISMIC METHODS

BACKGROUND OF THE INVENTION

1. Field of the Invention

The present invention relates generally to the field of geophysical surveying. More particularly, it concerns seismic methods and geophysical survey systems for petroleum and gas exploration that rely on an explosive seismic energy source that comprises an oxidizable metal material.

2. Description of Related Art

Seismic geophysical surveys are used in petroleum and gas exploration to map the following: stratigraphy of subterranean formations, lateral continuity of geologic layers, locations of buried paleochannels, positions of faults in sedimentary layers, and basement topography. Such maps are deduced through analysis of the nature of reflections and refractions of generated seismic waves from interfaces between layers within the subterranean formation.

A seismic energy source is used to generate seismic waves that travel through the earth and are then reflected by various subterranean formations to the earth's surface. As the seismic waves reach the surface, they are detected by an array of seismic detection devices, known as geophones, which transduce waves that are detected into representative electrical signals. The electrical signals generated by such an array are collected and analyzed to permit deduction of the nature of the subterranean formations at a given site.

Seismic energy sources that have been used in geophysical survey methods for petroleum and gas exploration include impact sources, gun sources, vibratory sources and explosives. The nature of output seismic energy depends on the type of seismic energy source that was used to generate it.

Fundamentally, an impact source is a weight striking the surface of the earth directly or impacting a plate placed on the earth's surface, yielding seismic energy. A weight-drop is an example of the former type of impact source. While impact sources tend to be relatively inexpensive and simple to operate and maintain, their principal disadvantage is that they are inefficient at producing seismic energy useful for geophysical survey of deeper layers. Impact sources yield a relatively high proportion of low frequency, surface waves and output less seismic energy than other seismic energy sources.

Gun sources, like impact sources, transfer kinetic energy into seismic energy. They rely on the sudden, powerful release of a charge of pressurized gas, usually compressed air from an air gun, to generate seismic waves. Gun sources have an advantage over impact sources in that they produce more seismic energy than is possible with simple impact sources. The seismic energy generated by gun sources also tends to be of higher-frequency than that imparted by impact sources, and this helps to minimize surface wave generation and improve resolution. However, gun source equipment tends to be more bulky and expensive than simple impact sources.

Vibratory sources are also used as seismic energy sources in geophysical survey methods. Two categories of vibratory sources include those that generate seismic waves originating at the surface and those that generate seismic waves that emanate from downhole. One mechanical-hydraulic vibratory source, the Vibroseis truck, is specially designed to place all of its weight onto a large platform which vibrates. This vibration, in turn, produces seismic waves in the subterranean formation. Vibroseis trucks have been used extensively in geophysical survey methods, not just for the petroleum and gas exploration, but also for studying the evolution and development of specific geological structures (e.g. the Rocky Mountains) and fault lines. Vibratory sources tend to produce highly repeatable seismic energy. The nature of the energy delivered into the ground by vibratory sources, its amount, duration, and time of delivery, can be tightly controlled and therefore the seismic energy generated tends to be very reproducible, which is a benefit. However vibratory sources are often not suited to certain types of terrain. For example if the ground is very soft, it can be difficult to use Vibroseis trucks as a seismic energy source.

Another type of seismic energy source used in geophysical survey relies on explosives. Explosive seismic energy sources used in petroleum and gas exploration on land rely on the explosion of material placed within a subterranean formation to generate seismic waves. Typically, a hole is drilled in the ground, the explosive is placed in the hole, and backfill is piled on top of the explosive, prior to initiating the explosion. Compared on a pound for pound basis to gun sources and impact sources, explosive sources impart the highest amount of seismic energy into the ground. Explosive seismic energy sources currently being used in geophysical survey methods generally produce waves of very high frequency. They are often used when the ground conditions are such as to prevent the effective use of impact or gun sources (i.e. when the ground is extremely soft).

Many explosives used in seismic energy sources generate high gas volumes. This is a useful property in mining for moving rock, but is undesirable in seismic exploration, because it decreases the amount of usable seismic energy that is generated. Explosives that produce high volumes of gas cause much of the energy of the explosion to be lost as expanding gases force backfilled material up the borehole into which the explosive was placed. Thus, less of the energy generated by the explosion is transferred into the subterranean formation than would be theoretically possible if less energy was lost to expansion of generated gases. In addition; the sudden expansion of a large volume of gas can cause permanent deformation of the subterranean formation itself.

At present, the demand for seismic exploration methods that generate sharper energy pulses, which can result in higher resolution images, has led to sacrificing the generation of low frequency seismic waves. This loss of low frequency waves compromises the ability to image deeper targets (e.g., >3 seconds). While Vibroseis has been used successfully in mapping deeper targets, it has been difficult to achieve the same quality of results using explosive seismic sources. This presents a significant problem when there is a need for mapping deeper subterranean formations but the ground conditions are not suited to Vibroseis. In the past, the response has been to drill deeper boreholes and use more explosive to achieve the desired results at such difficult mapping sites. Both drilling deeper and using more explosive substantially increase the cost of subterranean mapping of a particular site.

There is a need for improved seismic methods and geophysical survey systems that rely on explosive compositions that convert a higher percentage of the potential energy in the explosive composition into seismic energy . There is also a need for improved methods and systems that efficiently generate low frequency seismic waves when needed. Furthermore, it would be advantageous to be able to use shallower boreholes and less explosive to achieve the necessary level of data resolution for geophysical survey.

SUMMARY OF THE INVENTION

This invention provides improved seismic methods and geophysical survey systems that are well suited for petroleum and gas exploration, but could be used for other purposes as well.

One aspect of the invention is a seismic method that comprises the steps of generating seismic waves by exploding an explosive composition in a subterranean formation, and detecting the seismic waves and/or reflections thereof with seismic detectors. The explosive composition used in this method comprises a first explosive material and an oxidizable metal material. The explosive composition can suitably be placed in a borehole within the subterranean formation, and covered with backfill before being exploded. The explosive composition preferably is essentially nitrogen-free (e.g., the nitrogen content of the explosive composition is less than about 1 wt %, preferably less than about 0.1 wt %).

In one embodiment of the invention, the first explosive material is made by combining solid and liquid materials, for example in the proportions of 20 to 80 wt % solids and 20 to 80 wt % liquids. In this embodiment, it is preferred to combine the oxidizable metal material with the solids of the first explosive material.

The present invention is very well suited for use with first explosive materials that comprise a binary explosive (i.e., two components that are usually non-explosive until mixed together). For example, such a binary explosive can comprise an organic fuel component and an oxidizer component. Therefore, the organic fuel component and the oxidizer component can be transported separately and mixed on-site, reducing the risk of premature explosion. This embodiment can be made even safer by adjusting the arming time of the binary explosive. This can be done by adjusting the weight ratio of the oxidizer component to the organic fuel component. Therefore, the arming time can be made longer, causing the combined material to be non-explosive for a period of time after mixing. This period allows the combined material to be placed in a borehole can covered with backfill prior to the composition reaching an exploitable state.

Examples of suitable organic fuel components include diethylene glycol, ethylene glycol, propylene glycol, and glycerol. Other suitable organic fuel components include trinitrotoluene, dinitrotoluene, nitramines, pentaerythritol tetranitrate, nitrostarch, nitrocellulose, smokeless powders, glycol ethers, glycol ether acetates, formamides, alkanes, polyalcohols and low molecular weight mono-hydroxy alcohols. Nitramines as used herein is a group of organic fuel components comprising, for example, cyclotrimethylenetrinitramine (RDX, also known as hexahydro- 1,3,5-trinitro- 1,3,5-triazine) and cyclotetramethylenetetranitramine (HMX, also known as 1,3,5,7-tetranitro-1,3,5,7-tetraazacyclooctane). However, as mentioned above, nitrogen-free compositions are preferred.

Examples of suitable oxidizer components include ammonium nitrates, alkali metal nitrates, alkaline earth metal nitrates, ammonium perchlorates, alkali metal perchlorates, alkaline earth metal perchlorates, ammonium chlorates, alkali metal chlorates, alkaline earth metal chlorates, and hydrates thereof. Particularly preferred oxidizer components include sodium perchlorate, ammonium perchlorate, potassium perchlorate, potassium chlorate, ammonium nitrate, potassium nitrate and lithium perchlorate hydrate.

In one particular embodiment of the invention, the organic fuel component is a liquid and the oxidizer component is a solid. It is preferred that the organic fuel component has a composition such that it does not freeze above a temperature of about −45° C. For example, the liquid organic fuel component can comprise one or more of ethylene glycol, diethylene glycol, propylene glycol, glycerol, formamide, methanol and monoethyl ether.

The explosive composition preferably comprises about 0.5 to 50 wt % oxidizable metal material, more preferably about 10 to 30 wt % oxidizable metal material. Particularly preferred oxidizable metal materials include aluminum, magnesium, boron, calcium, iron, zinc, zirconium, silicon, ferrosilicon, ferrophosphorous, lithium hydride, lithium aluminum hydride, and mixtures or alloys of such metal compounds. Metal particulates are one example of suitable oxidizable metal materials. Optionally, the metal particulate is coated with a coating agent, such as at least one fatty acid or a salt thereof. The presence of the fatty acid can prevent premature oxidation of the oxidizable metal material. In this regard, it is useful to coat the oxidizable metal material with the fatty acid. Stearic acid is particularly preferred for this purpose. In addition, it is possible to treat the metal particulate with a dichromate. Preferably, the metal particulate has an average particle size of less than about 100 $\mu$m. More preferably, the metal particulate has an average particle size of less than about 50 $\mu$m, most preferably from about 10 $\mu$m to about 20 $\mu$m. Preferably the metal particulate is an aluminum particulate.

In one embodiment of the invention, the explosive composition is self-disarming (i.e., it becomes non-explosive after a period of time passes). One way this can be accomplished is by using a first explosive material that is water-soluble. This water-soluble first explosive material is placed in a container that is initially watertight but subsequently permits entry of water. As a result, the composition is initially explosive, but if for some reason it is not exploded within a desired period of time (e.g., within three months), water begins to enter the container and dissolve the first explosive material, eventually rendering the composition non-explosive (i.e., disarmed).

One specific embodiment of the invention is a seismic method comprising the steps of generating seismic waves by exploding an explosive composition in a subterranean formation wherein the explosive composition comprises an alkali metal perchlorate, a glycol, and particulate aluminum; and detecting the seismic waves and/or reflections thereof with seismic detectors.

Another aspect of the invention is a geophysical survey system, comprising a seismic energy source that comprises a first explosive material and an oxidizable metal material, as described above, with the seismic energy source being located in a subterranean formation. The system also includes a plurality of seismic detectors that are adapted to detect seismic waves generated when the seismic energy source explodes, and reflections of these waves. The seismic detectors transduce an electrical signal representative of the seismic waves and the reflections of seismic waves they detect. The system can also comprise a data acquisition and processing system that is in communication with the seismic detectors, for example through electrical data cables or by wireless data transmission. The data acquisition and processing system can sample the electrical signals generated by the seismic detectors and produce data representative thereof, for example by sampling and summing the data collected.

The current invention is an improvement on prior seismic methods and geophysical survey systems comprising an explosive seismic energy source, because it comprises an explosive composition that produces more seismic energy and less gas volume. In particular, it is expected that at least some embodiments of the current invention will yield at least 35% more seismic energy per unit mass of explosive composition than is generated by current explosive seismic energy sources, while reducing the gas volume produced by as much as about 45%. Using an explosive composition comprising an oxidizable metal material also facilitates generation of low frequency seismic waves as needed. Furthermore, the borehole in which the explosive composition is placed will not need to be drilled as deep, or less explosive will be required than in conventional methods, thereby providing cost savings.

Another embodiment of the present invention is directed to a method of preparing an explosive composition. Such a method comprises the steps of preparing a solid component that comprises an oxidizable metal material and a solid oxidizer component, preparing a liquid component that comprises at least one liquid from the group consisting of liquid organic fuel components and liquid oxidizer components, and combining the solid component and the liquid component to produce the explosive composition.

The oxidizable metal material of the explosive composition is as described above, and the solid oxidizer component comprises at least one of the oxidizer components described above. The solid component can further comprise at least one solid selected from the group consisting of solid organic fuel components and solid additives. Examples of solid organic fuel components that could be used are trinitrotoluene, dinitrotoluene, nitramines, pentaerythritol tetranitrate, nitrostarch, nitrocellulose, and smokeless powders.

The liquid organic fuel component comprises at least one liquid from the group of organic fuel components described above, but can also further comprise water. The liquid oxidizer component comprises at least one aqueous or non-aqueous solution of the oxidizer components described above.

The combining step can be performed at or in close proximity to the site at which the explosive composition is to be exploded. The liquid component and solid component can be combined within a shaped-charge container, or alternatively, the liquid component and solid component can be combined in a first container and then transferred to a shaped-charge container. Both the liquid component and the solid component can be non-explosive materials before they are combined, and the solid and liquid components can be transported to the vicinity of the site at which the explosive composition is to be exploded before the components have been combined. The explosive composition can be self-disarming and its arming time can be adjusted.

An additional benefit of the current invention is that explosive compositions used in the seismic methods and the geophysical survey systems can be shaped to give directivity to the propagated seismic energy. In addition, in at least some of the preferred embodiments of the current invention, components of the explosive composition are shipped separately as non-explosive substances to the geophysical survey site, where they are mixed to yield an explosive composition. This reduces the risk of injury due to premature explosion. In one specific embodiment of the invention, even after mixing the components on site, the explosive does not become armed until the solid component thereof becomes hydrated as a result of gradual diffusion of water into the solids after the solid and liquid components are mixed. This makes the composition even safer to use, by ensuring that the explosive will not become armed until after it is buried in the ground.

DESCRIPTION OF ILLUSTRATIVE EMBODIMENTS

Figure 1:
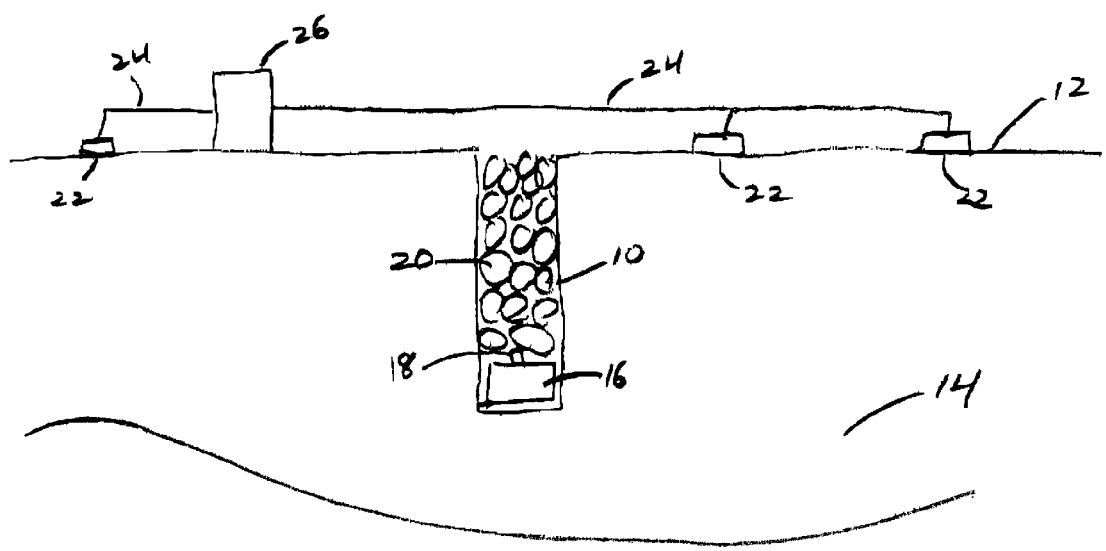
FIG. 1 is a schematic of a seismic survey system of the present invention.

The present invention provides a means of generating seismic waves by using an explosive seismic energy source. The explosive composition comprises a first explosive material and an oxidizable metal material.

It is preferred that the explosive composition be essentially nitrogen-free. Preferably, the explosive composition will contain less than about 1 wt % nitrogen, more preferably less than about 0.1 wt %, most preferably less than about 0.001 wt %. Explosion of nitrogen-containing explosive compositions can contribute to environmental pollution through emission of nitrogen oxides into the air and nitrates into surrounding water or land. Such emissions are regulated by federal and state environmental regulations. By selecting components for the explosive composition from materials that lack nitrogen, nitrogen emissions can be minimized.

Suitable examples of first explosive materials include trinitrotoluene, dinitrotoluene, nitramines, pentaerythritol tetranitrate, nitrostarch, nitrocellulose, smokeless powders, glycol ethers, glycol ether acetates, formamides, alkanes, polyalcohols and low molecular weight mono-hydroxy alcohols. Various other aldehydes, ketones, amines, amides, and alcohol-amines having explosive properties could also be used. As mentioned above, nitrogen-free explosive materials are especially preferred in the present invention. Suitable examples of low molecular weight mono-hydroxy alcohols that can be used as the first explosive material include methanol, ethanol, and isopropyl alcohol. More preferably, the first explosive material comprises at least one glycol, such as diethylene glycol, ethylene glycol, propylene glycol, glycerol, or a mixture of one or more of these.

In one embodiment of the invention, the first explosive material comprises a liquid component and a solid component. One or both of these components can be explosive by itself. It is desirable for the first explosive material to be comprised of about 20 to 80 wt % solids and about 20 to 80 wt % liquids, more preferably about 65 to 85 wt % solids and about 15 to 35 wt % liquids. It is preferred that the oxidizable metal material be combined with the solids of the first explosive material.

In one especially preferred embodiment of the invention, the first explosive material comprises a binary explosive comprised of at least two components (e.g., one that is liquid and one that is solid) that can be transported separately and mixed on-site. More preferably, the individual components of the binary explosive are classified as non-explosive substances for worldwide transport. Preferably, the frequency of on-site mixing is adjusted to satisfy drill and load production requirements, such that explosive composition is made as it is needed, and the amount prepared is no greater than will be used that same day.

The binary explosive can suitably comprise an organic fuel component and an oxidizer component. Suitable examples of such organic fuel components include diethylene glycol, ethylene glycol, propylene glycol, glycerol, and mixtures thereof. Suitable examples of such oxidizer components, which will often be solid, include ammonium nitrates, alkali metal nitrates, alkaline earth metal nitrates, ammonium perchlorates, alkali metal perchlorates, alkaline earth metal perchlorates, ammonium chlorates, alkali metal chlorates, alkaline earth metal chlorates, hydrates of any of these, and mixtures of any one or more of these materials. More preferably the oxidizer component comprises at least one material selected from the group consisting of sodium perchlorate, ammonium perchlorate, ammonium nitrate, potassium nitrate, potassium perchlorate, potassium chlorate, and lithium perchlorate hydrate. Most preferably the oxidizer component comprises at least one material selected from the group consisting of sodium perchlorate, potassium perchlorate, potassium chlorate, and lithium perchlorate hydrate.

Using a binary explosive offers opportunities for adjusting the arming time of the first explosive material (i.e., whether the binary explosive reaches an explosive state almost immediately after the individual components are mixed, or instead requires a period of time to become explosive). This can be done by adjusting the weight ratio of the oxidizer component to the organic fuel component. For example, if the first explosive material comprises 20 wt % diethylene glycol and 80 wt % sodium perchlorate, about two hours are required after their mixing before the first explosive material is "armed." "Armed" as used here means that the material can be successfully detonated. If it is desired that the first explosive material become armed only after a period of greater than two hours, the proportion of diethylene glycol in the explosive will be reduced accordingly.

Because the explosive compositions of the present invention will be used in widely varying climates, including some environments with very low ambient temperatures (e.g., in Alaska), it is useful for the composition to be resistant to freezing, at least down to temperatures of about −32° C., and more preferably down to about −45° C. This can be achieved in the present invention by using as the first explosive material a binary explosive, wherein the organic fuel is a liquid and the oxidizer component is a solid, and the liquid organic fuel component does not freeze above a temperature of about −32° C., and more about −45° C. Suitable examples of liquid organic fuel components that will have this characteristic include various compounds such as ethylene glycol, diethylene glycol, propylene glycol, glycerol, formamide, methanol, monoethyl ether, or mixtures of one or more of these compounds. Many other organic fuels that would also act as a fluidizing agent likewise could be used. These materials are all fluidizing agents that promote a liquid being retained in the liquid state at temperatures from about 25° C. to −32° C., more preferably from about 50° C. to −45° C.

Preferably, the oxidizable metal material comprises at least one material selected from the group consisting of aluminum, magnesium, boron, calcium, iron, zinc, zirconium, silicon, ferrosilicon, ferrophosphorous, lithium hydride, lithium aluminum hydride, and mixtures thereof. Compounds and alloys of such metals can be used as well. More preferably, the oxidizable metal material comprises at least one material from the group consisting of aluminum, magnesium, boron, calcium, iron, zinc, lithium hydride, and lithium aluminum hydride. Most preferably, the oxidizable metal material is aluminum.

The presence of the oxidizable metal in the explosive composition will increase the energy released, reduce the gas volume produced, and reduce the detonation velocity. In general, the higher the metal content of the explosive composition, the lower the detonation velocity. By maintaining a higher sustained energy release, seismic waves of lower frequency and higher amplitude can be generated, which allow for better penetration of the subterranean formation. The rate of energy released by explosion of such a composition will be dependent on the particle size of the oxidizable metal material.

Preferably, the oxidizable metal material comprises about 0.5 to 50 wt % of the explosive composition described, more preferably about 5 to 50 wt %, and most preferably about 10–30 wt%. Changing the wt % of the oxidizable metal material in the explosive composition and the grain size of the oxidizable metal material will change the density of the composition.

Preferably, the oxidizable metal material consists essentially of a metal particulate. Alternatively, the metal material can be in the form of one or more strips that are in contact with the first explosive material (e.g., a plurality of strips that are spread throughout a continuous matrix of explosive material). Another alternative would be a metal sheath or container that at least partially surrounds or encloses the first explosive material.

When the oxidizable metal is in particulate form, preferably it has an average particle size of less than about 100 μm. More preferably, the metal particulate has an average particle size of less than about 50 μm, most preferably from about 10 μm to about 20 μm. Preferably the metal particulate is an aluminum particulate.

To prevent the premature reaction of the oxidizable metal material, its surface may be protected with a coating agent. Suitable examples of such coatings include oxides and dichromate. In one particularly preferred embodiment, the surface of the oxidizable metal material is coated with a material that comprises a fatty acid or a salt thereof. Suitable fatty acids include those having from about 8 to 22 carbon atoms, more preferably about 16 to 18 carbon atoms Specific examples of fatty acids that could be used include:

Straight Chain Saturated Acids:
    Caprylic acid
    Pelargonic acid
    Capric acid
    Undecylic acid
    Lauric acid
    Tridecanoic acid
    Myristic acid
    Pentadecanoic acid
    Palmitic acid
    Margaric acid
    Stearic acid
    Nondecanoic acid
    Arachidic acid
    Heneicosanoic acid
    Behenic acid Branched Chain Saturated Acids:
    2-ethylhexanoic acid Unsaturated Acids:
    10-undecylenic acid
    Petroselenic acid
    Oleic acid
    Elaidic acid
    Vaccenic acid
    Erucic acid
    Brassedic acid
    Linoleic acid Linolelaidic acid Linolenic acid Elaidolinolenic acid Pseudoeliostearic acid Eleostearic acid Arachidonic acid Mixtures of two or more of any of these fatty acids can also be used. Of the fatty acids listed above, oleic acid and stearic acid and mixtures of fatty acids that comprise oleic, stearic, linoleic, linolenic and palmitic acids are particularly preferred. Most preferably, the surface of the oxidizable metal material is coated with stearic acid.

The explosive composition may further comprise at least one material selected from the group consisting of water, emulsifiers, solubilizing agents, binders, thickening agents, gelling agents, cross-linking agents, gassing agents, glass and plastic microbubbles (e.g., small hollow spheres), and bulking agents. The amounts and types of these materials added may be used to adjust the density of the explosive composition. Altering the density of the explosive composition will affect the detonatability of said composition and the nature of the shock front that it generates upon explosion. Preferably, the density of the explosive composition is in the range of about 1.6 g/cm$^3$ to 1.9 g/cm$^3$. Such density adjustments may be necessary when the level of oxidizable metal material in the explosive composition, the initial temperature of the explosive prior to detonation, and the type of output seismic energy that is to be generated are taken into account. Emulsifiers, solubilizing agents, binders, thickening agents, gelling agents, and cross-linking agents can help to maintain the uniform distribution of components within an explosive composition, which can be important for an explosion to proceed properly.

FIG. 1 shows a geophysical survey system of the present invention. A borehole 10 is drilled from the surface of the ground 12 into a subterranean formation 14. This borehole will typically be about 5–150 feet deep. An explosive composition, as described above, is placed into the borehole. Normally the explosive composition will be encased in a housing or container 16. The container can be made of molded plastic or it can itself be made of an oxidizable metal material. The explosive composition can be shipped in the container. However, it is also possible to ship the components separately in other containers, pour them into the container 16 on site, and mix as needed before (or after) sealing the container (e.g., by snapping or screwing a top cap onto a cylindrical housing). A detonation device 18, such as a blasting cap, is normally inserted into the container 16, and connected by a wire or cable to a source of electrical energy (not shown in FIG. 1) that can trigger the explosion. Backfill 20 is normally placed on top of the container 16 for the explosive material, to direct the energy of the explosion as much as possible into the ground, rather than upward through the borehole.

A plurality of geophones 22 are arranged at various points on the surface 12 of the ground, and are connected by cables 24 to a data acquisition and processing system 26, which will typically comprise a computer. Suitable data acquisition and processing systems, geophones, and methods for their placement and operation are well known to persons skilled in the field of seismic surveying. When the composition in the borehole is exploded, seismic waves propagate through the subterranean formation. The array of geophones and the data acquisition and processing system can then detect the seismic waves and/or reflections thereof, and process the data to place it into a form that can interpreted by humans.

In particular, the geophones transduce an electrical signal representative of the seismic waves and the reflections of seismic waves they detect. The data acquisition and processing system samples the electrical signals generated by the geophones and produces data representative thereof.

For safety reasons, it is preferred that the explosive composition be self-disarming, such that the first explosive material becomes non-explosive after it remains in the borehole for a minimum period of time. This can be achieved by using a water-soluble first explosive material, and placing it in a container, such as a cylindrical container with a cylindrical cap that snaps or screws on the larger part of the container. The container is initially watertight, but is designed to fail after a given amount of time at a given depth in the ground (e.g., three months at 60 feet depth below the surface of the ground), allowing groundwater to seep inside the container and dissolve the explosive material, thereby rendering it non-explosive. For example, the bottom of the container could comprise a metal disk having a selected thickness. The metal in this disk would gradually corrode when in contact with groundwater, and would eventually fail as a result of this corrosion, allowing groundwater to enter the container. Increasing the thickness of the disk would increase the time required before failure occurred.

Another embodiment of the present invention is directed to a method of preparing an explosive composition. Such a method comprises the steps of preparing a solid component that comprises an oxidizable metal material and a solid oxidizer component, preparing a liquid component that comprises at least one liquid from the group consisting of liquid organic fuel components and liquid oxidizer components, and combining the solid component and the liquid component to produce the explosive composition.

Preparation of the solid component comprises combining the oxidizable metal material and solid oxidizer component. Preferably, this combining yields a mixture in which components are relatively evenly distributed throughout. Preferably, the oxidizable metal material of the explosive composition is as described above. While the oxidizable metal material that comprises the solid component is a solid, preferably a solid particulate, it may be coated with a non-solid material, like a liquid or a gel, to prevent premature oxidation of the oxidizable metal material. Such non-solid oxidizing metal coating materials, as well as solid oxidizing metal coating materials are described above.

The solid oxidizer component of the solid component comprises at least one solid selected from the oxidizer components described above.

In addition to the oxidizable metal material and the solid oxidizer component, the solid component can further comprise at least one solid selected from the group consisting of solid organic fuel components and solid additives. Preferably, the at least one solid organic fuel component is selected from the group consisting of trinitrotoluene, dinitrotoluene, nitramines, pentaerythritol tetranitrate, nitrostarch, nitrocellulose, and smokeless powders.

Additives that may be added to the explosive composition include: emulsifiers, solubilizing agents, binders, thickening agents, gelling agents, cross-linking agents, gassing agents, glass and plastic microbubbles (e.g., small hollow spheres), and bulking agents. Some of these additives will be in the form of solids, while others will not.

The liquid component comprises at least one liquid from the group consisting of liquid organic fuel components and liquid oxidizer components. Preferably, the liquid component comprises at least one liquid organic fuel component. It is preferred that the at least one liquid organic fuel component comprise a liquid from the group of organic fuel components described above. The liquid component may further comprise water. The liquid oxidizer component may comprise an aqueous or non-aqueous solution of at least one of the oxidizer components described above. Non-aqueous solutions may, for example, use alcohols, such as methanol, as solvents.

It is preferred that the combining step be performed at or in close proximity to the site at which the explosive composition is to be exploded. It is also preferred that both the liquid component and the solid component be non-explosive before they are combined, allowing the liquid component and the solid component to be transported as non-explosive materials to the vicinity of the site at which the explosive composition is to be exploded.

An additional benefit of the current invention is that explosive compositions can be shaped to give directivity to the energy released when the explosive composition is exploded. As examples, shaped charges may be used to improve the quality of seismic energy generated for geophysical surveys or to may be used to perforate well casings in a specific direction. When the explosive composition is to be used in a shaped charge, the liquid component and solid component may be combined in a first container and then transferred to a shaped-charge container, but more preferably, the liquid component and solid component are combined within a shaped-charge container. In one preferred embodiment of the present invention, the solid component is prepared in the shaped-charge container and the liquid component is subsequently added to it and combined with it.

As described above for the first explosive material, it is preferred that the explosive composition made using this method be self-disarming. This can be achieved by making the explosive water-soluble, such that the explosive composition becomes non-explosive after being infiltrated by excess water. If for example, the explosive composition is placed in a borehole, it is preferred that it becomes non-explosive after remaining in the borehole for a period of time. By having a water-soluble explosive composition prepared by this method, and placing it in a container that is designed to penetrated by water after a minimum amount of time, such disarming can be achieved. Such a container is described above.

Preferably, the explosive composition produced by this method will be comprised of about 20 to 80 wt % solid component and about 20 to 80 wt % liquid component. Furthermore, in certain preferred embodiments, the arming time of the explosive composition can be adjusted, by adjusting the weight ratio of the solid component to the liquid component.

The following example is included to demonstrate a specific embodiment of the invention. It should be appreciated by those of skill in the art that the techniques disclosed in the example which follows represents techniques discovered by the inventor to function well in the practice of the invention, and thus can be considered to constitute a preferred mode for its practice. However, those of skill in the art should, in light of the present disclosure, appreciate that many changes can be made in the specific embodiments which are disclosed and still obtain a like or similar result without departing from the spirit and scope of the invention.

EXAMPLE 1.

One hundred twenty-eight test explosions were performed to generate seismic waves in a subterranean formation ill suited for using a Vibroseis seismic energy source. The seismic waves generated by these explosions and their reflections from the subterranean formations were detected by geophones and transduced into representative electrical signals. These representative electrical signals were analyzed to determine which explosions yielded the greatest amount of mapping information at the highest resolution.

Thirty-two sets of test explosions were done. Each set consisted of four test explosions, one test explosion with each of four different explosives. One of the four explosives used was a high energy melt cast explosive (HEMCE) in accordance with the present invention. The HEMCE consisted of 20 wt % aluminum particulate (average particle size about 20 microns) and 80 wt % of a first explosive material that comprised 30 wt % diethylene glycol and 70 wt % ammonium perchlorate. Other explosives tested included: Dynoseis (commercially available from Dyno Nobel), Dyno AP (commercially available from Dyno Nobel), and Iremite TX (commercially available from Dyno Nobel). Dynoseis and Dyno AP are explosives currently used in explosive seismic energy sources for petroleum and gas exploration. Dynoseis comprises 30 wt % diethylene glycol and 70 wt % ammonium perchlorate, but it does not comprise any oxidizable metal material. Dyno AP comprises ammonium perchlorate. Iremite TX is an emulsion explosive that has not been used in petroleum and gas exploration. It is an aluminum nitrate-based trenching explosive typically used in mining, and comprises about 8 wt % aluminum.

The sets of test explosions with the four different explosives were carried out with either a single hole or two hole pattern (i.e., one or two boreholes were drilled in the ground and the explosives were placed therein). Two hole test patterns were only used at a depth of 10 feet with 1.5 pounds of explosive per hole. Test explosions were performed with 1.5, 3, 4.5, 6, 9, and 12 pounds of each type of explosive. Test explosions with 1.5 pounds of explosive were performed at depths of 10 (4 sets of two hole pattern) and 20 feet (4 sets of single hole pattern). Single test explosions with 3 pounds of explosive were performed at depths of 20 (4 sets), 40 (2 sets), and 60 feet (2 sets). 4.5 pounds of explosive were tested in single hole patterns at a depth of 40 feet (2 sets). 6 pounds of the various explosives were exploded at depths of 40 (2 sets), 60 (2 sets), 80 (2 sets), and 100 feet (2 sets) in single boreholes within the subterranean formation. Tests of 9 pounds of each explosive were performed at depths of 80 (2 sets) and 100 feet (2 sets). 12 pounds of explosive were only tested in single boreholes 100 feet deep (2 sets).

Averaging the results of the 132 test explosions performed generated the following table.

|  | Explosive | | | |
| --- | --- | --- | --- | --- |
|  | Dynoseis Al = 00% | HEMCE Al = 20% | Dyno AP Al = 00% | Iremite TX Al = 08% |
| Density (g/cc) | 1.78 | 1.70 | 1.16 | 1.17 |
| Detonation Velocity (ft/sec) | 22,000 | 18,140 | 15,400 | 16,400 |
| Detonation Pressure (Kbar) | 200 | 139 | 65 | 78 |
| Gas Volume (moles/kg) | 23.2 | 13.0 | 41.0 | 34.0 |

It is believed that HEMCE yields at least 35% more seismic energy than any of the other explosives tested. In addition, tests revealed that resolution of data collected when using 4.5 pounds of HEMCE in the explosive seismic energy source was 5 comparable to that of data collected when using 6 pounds of Dynoseis in the seismic energy source. Furthermore, little or no improvement in the resolution of the data collected was noted when comparing seismic energy sources that consisted of the same weight of HEMCE being exploded in boreholes at depths of 60, 80, and 100 feet in the same lithography, suggesting that HEMCE could be used in shallower boreholes without substantial degradation of results. Test results suggest that use of HEMCE yielded better penetration than standard, commercially available explosives.

All of the methods disclosed and claimed herein can be made and executed without undue experimentation in light of the present disclosure. While the methods of this invention have been described in terms of preferred embodiments, it will be apparent to those of skill in the art that variations may be applied to the methods and in the steps or in the sequence of steps of the method described herein without departing from the concept, spirit and scope of the invention. More specifically, it will be apparent that certain agents that are chemically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A seismic method, comprising the steps of:
    generating seismic waves by exploding an explosive composition in a subterranean formation, wherein the explosive composition comprises a first explosive material and an oxidizable metal particulate having an average particle size of less than about 100 μm and;
    detecting the seismic waves and/or reflections thereof with seismic detectors.
2. The seismic method of claim 1, wherein the explosive composition is placed in a borehole within the subterranean formation.
3. The seismic method of claim 1, wherein the explosive composition is self-disarming.
4. The seismic method of claim 3, wherein the first explosive material is water-soluble.
5. The seismic method of claim 4, wherein the first explosive material is located in a container that is initially watertight but subsequently permits entry of water.
6. The seismic method of claim 1, wherein the explosive composition further comprises water.
7. The seismic method of claim 1, wherein the explosive composition is essentially nitrogen-free.
8. The seismic method of claim 1, wherein the explosive composition further comprises at least one material selected from the group consisting of emulsifiers, solubilizing agents, binders, thickening agents, gelling agents, cross-linking agents, gassing agents, microbubbles, and bulking agents.
9. The seismic method of claim 1, wherein the explosive composition further comprises at least one fatty acid or a salt thereof.
10. The seismic method of claim 9, wherein the at least one fatty acid is aliphatic monocarboxylic acid having from about 8–22 carbon atoms or a salt thereof.
11. The seismic method of claim 9, wherein the explosive composition comprises stearic acid or a salt thereof.
12. The seismic method of claim 1, wherein the first explosive material is water-soluble.
13. The seismic method of claim 1, wherein the first explosive material is made by combining 20 to 80 wt % solids and 20 to 80 wt % liquids.
14. The seismic method of claim 10, wherein the oxidizable metal particulate is combined with the solids of the first explosive material.
15. The seismic method of claim 1, wherein the first explosive material comprises a binary explosive comprising an organic fuel component and an oxidizer component.
16. The seismic method of claim 15, wherein the organic fuel component and the oxidizer component are non-explosive when not mixed with each other.
17. The seismic method of claim 15, further comprising the step of transporting the organic fuel component and the oxidizer component separately and mixing them on-site.
18. The seismic method of claim 15 further comprising the step of:
    adjusting the arming time of the binary explosive by adjusting the weight ratio of the oxidizer component to the organic fuel component.
19. The seismic method of claim 15, wherein the organic fuel component comprises at least one material selected from the group consisting of diethylene glycol, ethylene glycol, propylene glycol, and glycerol.
20. The seismic method of claim 15, wherein the organic fuel component comprises at least one material selected from the group consisting of trinitrotoluene, dinitrotoluene, nitramines, pentaerythritol tetranitrate, nitrostarch, nitrocellulose, smokeless powders, glycol ethers, glycol ether acetates, formamides, alkanes, polyalcohols and low molecular weight mono-hydroxy alcohols.
21. The seismic method of claim 15, wherein the organic fuel component comprises at least one nitramine selected from the group consisting of RDX and HMX.
22. The seismic method of claim 15, wherein the oxidizer component comprises at least one material from the group consisting of ammonium nitrates, alkali metal nitrates, alkaline earth metal nitrates, ammonium perchlorates, alkali metal perchlorates, alkaline earth metal perchlorates, ammonium chlorates, alkali metal chlorates, alkaline earth metal chlorates, and hydrates thereof.
23. The seismic method of claim 22, wherein the oxidizer component comprises at least one material selected from group consisting of sodium perchlorate, ammonium perchlorate, potassium perchlorate, potassium chlorate, ammonium nitrate, potassium nitrate and lithium perchlorate hydrate.
24. The seismic method of claim 15, wherein the organic fuel component is a liquid and the oxidizer component is a solid.
25. The seismic method of claim 24, wherein the organic fuel component does not freeze above a temperature of about −32° C.
26. The seismic method of claim 25, wherein the liquid organic fuel component comprises at least one material selected from the group consisting of ethylene glycol, diethylene glycol, propylene glycol, glycerol, formamide, methanol and monoethyl ether.
27. The seismic method of claim 1, wherein the explosive composition comprises about 0.5 to 50 wt % oxidizable, metal particulate.
28. The seismic method of claim 27, wherein the explosive composition comprises about 10 to 30 wt % oxidizable metal particulate.
29. The seismic method of claim 1, wherein the oxidizable metal particulate comprises at least one material selected from the group consisting of aluminum, magnesium, boron, calcium, iron, zinc, zirconium, silicon, ferrosilicon, ferrophosphorous, lithium hydride, lithium aluminum hydride, and mixtures or alloys of such metal compounds.

30. The seismic method of claim 1, wherein the metal particulate is coated with a it coating agent.

31. The seismic method of claim 1, wherein the metal particulate is treated with a dichromate.

32. The seismic method of claim 1, wherein the metal particulate is an aluminum particulate with an average particle size less than about 50 μm.

33. The seismic method of claim 29, wherein the oxidizable metal particulate comprises aluminum.

* * * * *